Patented Dec. 10, 1935

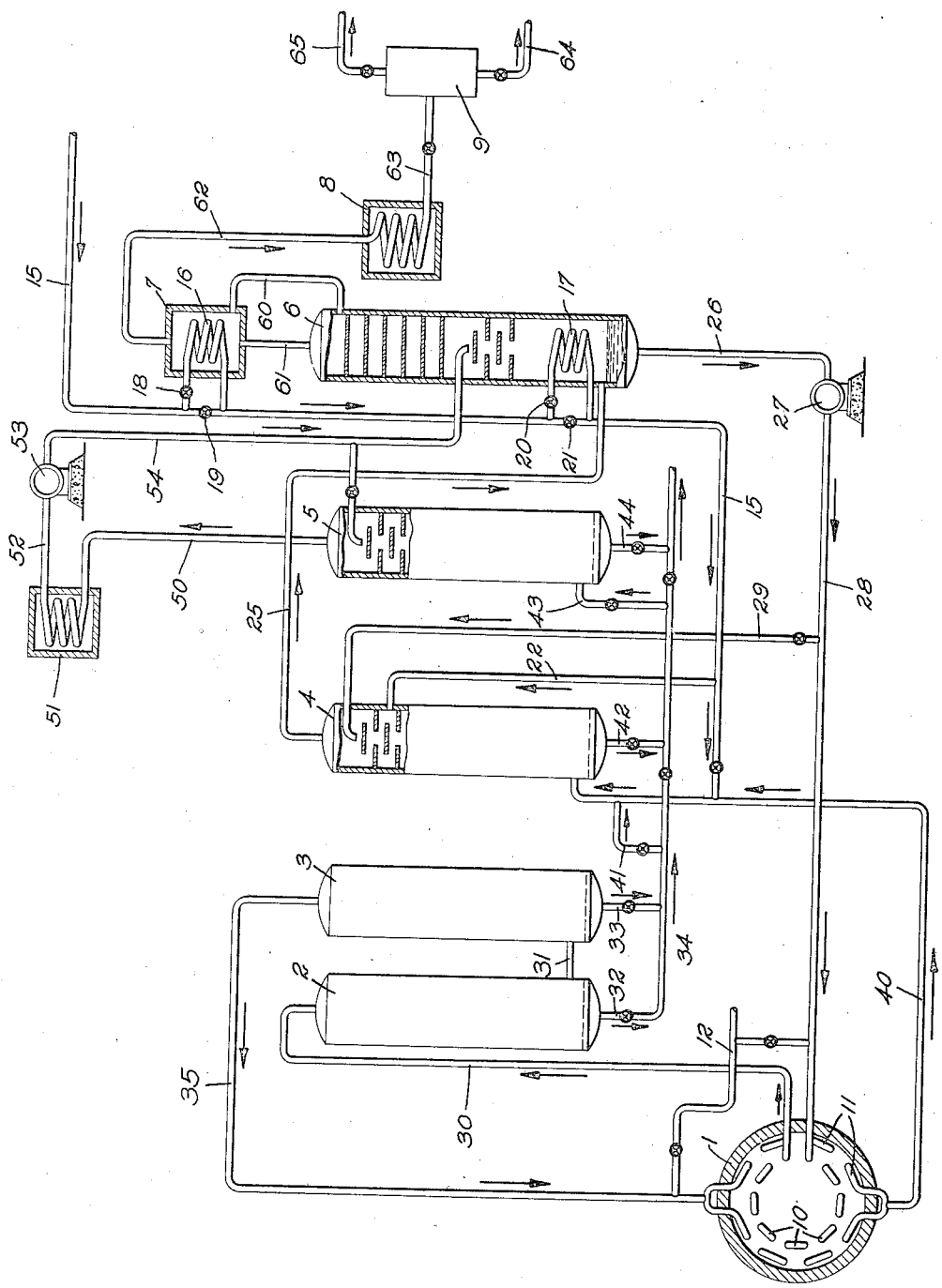

2,023,775

UNITED STATES PATENT OFFICE 2,023,775

CONVERSION OF HYDROCARBON OILS

Richard F. Trow, Port Arthur, Tex., assignor to The Texas Company, New York, N. Y., a corporation of Delaware Application May 19, 1931, Serial No. 538,593

12 Claims. (Cl. 196—60)

This invention relates to the distillation of hydrocarbon oils and has particular reference to cracking and vaporizing processes with several phases of conversion in a tube and drum system.

The present invention broadly contemplates a novel combination of liquid phase, vapor phase and low liquid level cracking including desirable modifications of each, in which most of the advantages of each process are incorporated and from which many of the drawbacks normal to each are eliminated. Low liquid level cracking or digestion of the heated oil, a more recent development in the art, is employed in which oil to be converted is appropriately heated and delivered into one or more vessels from which substantially all liquid is kept withdrawn while the vapor and mist undergo a time of digest.

One of the foremost objects is to produce a satisfactory ultimate yield of high anti-knock motor fuel, an ultimate pitchy residue which cannot be further treated in the same operation to advantage and little or no coke and gas. In operating to this end it is important to obtain an exceedingly clean rather refractory oil that does not contain an appreciable amount of heavy less refractory constituents for charging to the heater so that its temperature may be raised sufficiently high to produce the good quality motor fuel and yet not produce excessive coke and gas.

When running to ultimate yields of motor fuel and heavy residue all other residue deposited in the reaction vessels or elsewhere in the system is delivered into a low pressure flash tower or autogenous distillation zone or auto-distillation still where such lighter constituents as may have become combined with it or failed to have been vaporized in the cracking zone are distilled off by the sensible heat of the mixture and the reduced pitchy residue is discharged from the system. The motor fuel portion of the lighter fraction which is developed in the auto-distillation still is combined with the other motor fuel produced in the process and the gas oil portion is combined with the other cracking stock and resubjected to cracking.

According to the invention a fresh charge oil which may be an unclean gas oil or topped crude petroleum is delivered into a combination reaction vessel and distillation zone in open contact with hot cracked vapors where the lighter portion is vaporized and the heavier portion is cracked and is separated into a vapor and a residue. The depositing residue is withdrawn to an auto-distillation still where it is developed into an ultimate residue and a vapor. The vapor from the reaction vessel is scrubbed clean and delivered to a fractionator and the vapor from the auto-distillation still is scrubbed clean and condensed and delivered to the same fractionator where an ultimate motor fuel vapor is delivered overhead while a clean gas oil condensate is withdrawn and charged to a heater. The heated oil is delivered into one or more reaction vessels from which a vapor that is developed is passed thru a vapor phase cracking coil and delivered into a further reaction and distillation vessel into which residue from the first reaction vessels and the fesh charge oil is also delivered.

The invention may be more clearly understood from a description of the process in connection with the apparatus and for this purpose I will now refer to the drawing which shows a diagrammatical arrangement for carrying out the invention.

In the drawing 1 is a furnace in which heater coils 10 and 11 are situated, 2 and 3 are reaction vessels, 4 is a reaction and distillation vessel, 5 is an auto-distillation still, 6 is a fractionator, 7 is a reflux condenser, 8 is a final condenser and 9 is an accumulator drum.

A line 12 is provided from a source of clean oil supply, not shown, for supplying oil to the coils 10 and 11 when starting the operation.

A charge line 15 leads thru the heat interchange coils 16 and 17 of reflux condenser 7 and fractionator 6, respectively, or may by-pass either one or by manipulation of the valves 18, 19, 20 and 21, into a vapor transfer line 40 and thru a branch line 22 into the upper portion of the vessel 4 or into either one only.

A vapor line 25 connects the upper portion of the vessel 4 with the lower portion of the fractionator 6.

A pump 27 takes suction thru a line 26 from the bottom of the fractionator 6 and discharges thru a line 28 into the heater coil 10. A branch line 29 leads from the line 28 to the upper portion of the vessel 4. A line 30 leads from the outlet of the heater 10 to the upper portion of the vessel 2. A line 31 connects the bottoms of the vessels 2 and 3 and these vessels are also provided with draw-off lines 32 and 33 which connect to a manifold line 34.

A vapor line 35 connects the upper portion of the vessel 3 with the heater coil 11, the outlet of which is connected to a line 40 which leads to the lower portion of vessel 4. A line 41 is provided connecting the manifold line 34 and the transfer line 40.

A line 42 leads from the bottom of vessel 4 into the manifold line 34 and a connection 43 is provided between line 34 and the lower portion of vessel 5. The draw-off line 44 leads from the bottom of the vessel 5 into the manifold line 34.

A vapor line 50 leads thru a condenser 51 which has an outlet line 52 leading to a pump 53 which is connected to the mid section of fractionator 6 by a line 54.

A vapor line 60 and a run back line 61 connect the upper portion of the fractionator 6 with the reflux condenser 7. A line 62 leads from the upper portion of the reflux condenser 7 to a final condenser 8 which has an outlet line 63 connecting to accumulator 9 having a liquid outlet 64 and a gas outlet 65.

In a preferred mode of operation a sufficient amount of clean gas oil from a source not shown is pumped into the heater coils to get the process under operating conditions and a switch is then made to a charge oil which may be an unclean gas oil or topped crude. This is preferably passed thru the coils 16 and 17 and is split into two streams, one of which is delivered into the transfer line 40 which conveys hot cracked vapor from the vapor cracking coil 11 to the vessel 4 and the other is delivered to one of a series of baffles in the upper portion of the vessel 4 thru the pipe 22.

The vapor leaving the cracking coil 11, of which there is a large volume, having a temperature of approximately 1000° F. is quenched by a regulated portion of the cooler charge oil which is delivered into the transfer line and also by the residue from the cracking vessels 2 and 3 which is introduced thru the line 41. The residue, which is about 840° F., is hotter than the charge oil but is cooler than the hot vapor leaving the cracking coil 11. This quenching reduces the temperature of the mixture sufficiently to slow up the cracking rate so that substantially no coke will be formed and deposited in the vessel 4. At the same time the temperature is high enough to effect cracking of the heavier constituents of the charge oil and will effect vaporization of the cracked constituents, the lighter gas oil fraction of the charge oil and the lighter portion of the residue from the vessels 2 and 3.

The mixture of hot vapors rising in the vessel 4 encounter the stream of fresh charge introduced to one of the baffles in the upper portion of the vessel and crack and vaporize it to a desirable extent.

In order to regulate the temperature of the vapor in the lower portion of the vessel the amount of fresh charge introduced into the vapor line 40 or the upper portion of the vessel may be varied by manipulation of the valves in the lines 15 and 22.

The portion of fresh charge introduced into the upper portion of the vessel will overflow the baffles and undergoing heating by the hotter rising vapors will be subjected to somewhat milder cracking conditions than that portion introduced into the transfer line. The temperature will be high enough, however, to effect sufficient cracking and vaporization of the fresh charge.

The total resultant vapors which may carry some tarry particles mechanically are subjected to a scrubbing in the uppermost baffles by a portion of the clean cracking stock returned thru the line 29.

The clean vapor emerging from the top of the vessel 4 is conducted to the fractionator 6 where it undergoes any conventional fractionation to produce a vaporous motor fuel which is condensed and discharged to storage, and a clean gas oil condensate; that is, a gas oil of light color and containing none of those constituents which decompose readily into coke and gas at the temperature which I establish in the cracking zones.

A residue being deposited in the vessel 4 is delivered into the vessel 5 under considerably reduced pressure, say 10 pounds per square inch, where the lighter constituents such as the contained gas oil and gasoline fraction, are distilled off by the sensible heat of the residue. An ultimate resulting residue substantially stripped of constituents which might be economically further treated in the system, is discharged. The vapor is scrubbed in the upper portion of the vessel, a condensed portion of itself being used as a scrubbing medium, to render it clean. The emerging vapor is condensed and pumped into the fractionator 6 and is there subjected to the beneficial stabilizing effect of the higher pressure along with the vapor from the vessel 4.

The level of the condensate which is carried in the fractionator 6 is preferably kept low so as to reduce time of digestion of any liquid in this zone to a minimum.

The condensate which is withdrawn therefrom at about 750° F. is passed rapidly thru the heater coil 10 where the temperature is raised to about 900° F. and is delivered into the first of a series of reaction chambers where it is subjected to low liquid level cracking conditions in which a pressure of about 400 pounds per square inch is maintained. The level of the liquid in these vessels is kept down to a minimum, allowing just enough to accumulate to insure a liquid seal, that is so that no vapor will be withdrawn. The vapor and mist particles are conducted from the first of the two vessels thru line 31 into the second vessel 3 and emerging from the top thereof are freed of liquid and carbonaceous particles and are delivered into vapor phase cracking coil 11 where the temperature is raised to about 1000° F.

The highly heated vapor leaving the coil 11 is transferred to the reaction vessel 4 en route to which a portion of the fresh charge and the residue which is withdrawn from the cracking vessels 2 and 3 are mixed with it.

There will of course be some pressure drop during the passage of the vapors thru the heater coil but it is desirable to keep a pressure as near 400 pounds per square inch as is possible in the vessel 4 and also in the fractionator.

The conditions maintained in the vessel 4 and thruout the remainder of the system have been previously described.

When operating according to the conditions just described, it will be possible to treat substantially all of the charge oil, except of course those constituents which decompose readily into coke and gas, in the high temperature cracking zone of the system where the high grade anti-knock motor fuel will be developed. Such initial cracking of the charge is done in the vessel 4 as will substantially effect only the less refractory constituents of the charge oil which are preferably converted in that zone.

It is to be understood that various modifications may be made without departing from the spirit of the invention and therefore only such limitations should be imposed as are indicated in the appended claims.

I claim:
1. The method for conversion of hydrocarbon oils which comprises heating a flowing stream of clean oil to a high temperature of conversion, transferring the heated oil to enlarged zones, vaporizing and further converting portions of the oil therein, transferring the evolving vapors to a coil and heating them to a temperature higher than that to which the stream of oil is heated, withdrawing a depositing residue from the enlarged zones, removing the highly heated vapors from the coil and commingling them with a portion of the cooler charge oil to thereby reduce the temperature of the vapors and to increase the temperature of the charge oil portion to that of conversion, commingling the residue withdrawn from the enlarged zones with the vapors and the admixed oil, passing the commingled products into a reaction and distillation vessel, delivering a stream of charge oil into the upper portion of the vessel, scrubbing the resultant total vapors in the distillation zone, transferring and fractionating the scrubbed vapors to develop an overhead ultimate motor fuel and the clean oil first mentioned while withdrawing residue from the reaction and distillation vessel.

2. The method for conversion of hydrocarbon oils which comprises heating a flowing stream of clean oil to a high temperature of conversion, transferring the heated oil to enlarged zones, vaporizing and further converting portions of the oil therein, transferring the evolving vapors to a coil and heating them to a temperature higher than that to which the stream of oil is heated, withdrawing a depositing residue from the enlarged zones as it is deposited so as to prevent accumulation of a body of it therein, removing the highly heated vapors from the coil and commingling them with a portion of the cooler charge oil to thereby reduce the temperature of the vapors and to increase the temperature of the charge oil portion to that of conversion, commingling the residue withdrawn from the enlarged zones with the vapors and the admixed oil, passing the commingled products into a reaction and distillation vessel, delivering a stream of charge oil into the upper portion of the vessel, scrubbing the resultant total vapors in the distillation zone, transferring and fractionating the scrubbed vapors to develop an overhead ultimate motor fuel and the clean oil first mentioned while withdrawing residue from the reaction and distillation vessel as it is deposited so as to prevent accumulation of a body of it therein.

3. The method for conversion of hydrocarbon oils to an ultimate yield of motor fuel and residue which comprises heating a flowing stream of clean oil to a high temperature of conversion, transferring the heated oil to enlarged zones, vaporizing and further converting portions of the oil therein, transferring the evolving vapors to a coil and heating them to a temperature higher than that to which the stream of oil is heated, withdrawing depositing residue from the enlarged zones at is is deposited so as to prevent accumulation of a body of it therein, removing the highly heated vapors from the coil and commingling them with a portion of the cooler charge oil to thereby reduce the temperature of the vapors and to increase the temperature of the charge oil portion to that of conversion, commingling the residue withdrawn from the enlarged zones with the vapors and the admixed oil, passing the commingled products into a reaction and distillation vessel, delivering a stream of charge oil into the upper portion of the vessel, scrubbing the resultant total vapors in the distillation zone, transferring and fractionating the scrubbed vapors to develop an overhead ultimate motor fuel and the clean oil first mentioned, withdrawing residue from the reaction and distillation vessel as it is deposited so as to prevent accumulation of a body of it therein, transferring the residue to an autogenous distillation zone of reduced pressure, scrubbing and condensing an evolved vapor, transferring the condensate and fractionating it with the first mentioned scrubbed vapors while withdrawing an ultimate residue from the autogenous distillation zone.

4. The method of conversion of hydrocarbon oils to an ultimate yield of motor fuel and residue which comprises heating a stream of clean oil to conversion temperature, transferring the heated oil to the first one of a plurality of reaction vessels, vaporizing and further converting portions of the oil therein, transferring evolving vapors to a coil, superheating the vapors to effect further conversion thereof, maintaining a low level of liquid in the first vessel by withdrawing unvaporized oil as fast as it is deposited, commingling the unvaporized oil as it is withdrawn with the superheated vapors, commingling a stream of fresh charge oil with the superheated vapors, transferring the mixture to a further reaction and distillation vessel, depositing a residue and evolving further vapor therein, scrubbing the total resultant vapors, transferring the depositing residue as it is deposited to an autogenous distillation zone of reduced pressure, discharging an ultimate residue therefrom, scrubbing and condensing a forming vapor, transferring the vapors from the reaction and distillation zone to a fractionater, delivering the condensate from the autogenous distillation zone to the fractionator, fractionating the vaporous and liquid fractions to form an ultimate overhead motor fuel and the clean oil for heating as first mentioned.

5. The method for conversion of hydrocarbon oils to an ultimate yield of motor fuel and residue which comprises heating a stream of clean oil in a confined passageway to a conversion temperature, transferring the heated oil to a reaction vessel, withdrawing unvaporized and condensed oil from the reaction vessel to prevent accumulation of a body of residue therein and to establish conditions of conversion of the vapor and the liquid particles being developed therein, withdrawing vapors from the reaction vessel which consists of cracked and partially cracked constituents, subjecting the vapors to vapor phase cracking, commingling the highly heated vapors from the vapor phase cracking zone with cooler charge oil and with the liquid withdrawn from the first reaction vessel, delivering the mixture into another vessel, developing a vapor and a residue therein, scrubbing the vapor and transferring it to a fractionator, transferring the residue as it is deposited to an autogenous distillation zone of reduced pressure, developing a vapor and an ultimate residue therein, discharging the residue, scrubbing and condensing the vapor and transferring it to the said fractionator and fractionating the vapor and liquid therein to produce an ultimate motor fuel and the first mentioned clean oil.

6. The method of converting higher boiling hydrocarbon oils into lower boiling ones that comprises subjecting an oil consisting substantially entirely of cycle condensate to cracking temperature in transit through a heating coil, passing the heated oil into an enlarged reaction zone wherein cracking temperature under superatmospheric pressure is maintained and separation of vapors from liquid occurs, withdrawing liquid from said reaction zone at a rate adequate to prevent the accumulation of liquid therein, heating the separated vapors in a confined stream to a higher cracking temperature than that to which said condensate oil is heated, passing the vapors thus heated into a second reaction zone wherein cracking temperature under superatmospheric pressure is maintained and separation of vapors from liquid occurs, tempering the heat of reaction in said second reaction zone by introducing charging stock thereinto at a relatively low temperature, withdrawing liquid from said second reaction zone at a rate adequate to prevent the accumulation of liquid therein, subjecting vapors from said second reaction zone to fractionation to separate out a final light distillate and a reflux condensate and directing the reflux condensate to said heating coil.

7. The method of converting higher boiling hydrocarbon oils into lower boiling ones that comprises subjecting an oil consisting substantially entirely of cycle condensate to cracking temperature in transit through a heating coil, passing the heated oil into an enlarged reaction zone wherein cracking temperature under superatmospheric pressure is maintained and separation of vapors from liquid occurs, heating the separated vapors in a confined stream to a higher cracking temperature than that to which said condensate oil is heated, passing the vapors thus heated into a second reaction zone wherein cracking temperature under superatmospheric pressure is maintained and separation of vapors from liquid occurs, withdrawing liquid from the first reaction zone at a rate adequate to prevent the accumulation of liquid therein and directing liquid thus withdrawn into said second reaction zone, tempering the heat of reaction in said second reaction zone by introducing charging stock thereinto at a relatively low temperature, withdrawing liquid from said second reaction zone at a rate adequate to prevent the accumulation of liquid therein, subjecting vapors from said second reaction zone to fractionation to separate out a final light distillate and a reflux condensate and directing the reflux condensate to said heating coil.

8. The method of converting higher boiling hydrocarbon oils into lower boiling ones that comprises subjecting an oil consisting substantially entirely of cycle condensate to cracking temperature in transit through a heating coil, passing the heated oil into an enlarged reaction zone wherein cracking temperature under superatmospheric pressure is maintained and separation of vapors from liquid occurs, heating the separated vapors in a confined stream to a higher cracking temperature than that to which said condensate oil is heated, passing the vapors thus heated into a second reaction zone wherein cracking temperature under superatmospheric pressure is maintained and separation of vapors from liquid occurs, withdrawing liquid from the first reaction zone at a rate adequate to prevent the accumulation of liquid therein and directing liquid thus withdrawn into said second reaction zone, withdrawing liquid from said second reaction zone at a rate adequate to prevent the accumulation of liquid therein, subjecting vapors from said second reaction zone to fractionation to separate out a final light distillate and a reflux condensate and directing the reflux condensate to said heating coil.

9. The method of converting higher boiling hydrocarbon oils into lower boiling ones that comprises subjecting an oil consisting substantially entirely of cycle condensate to cracking temperature in transit through a heating coil, passing the heated oil into an enlarged reaction zone wherein cracking temperature under superatmospheric pressure is maintained and separation of vapors from liquid occurs, withdrawing liquid from said reaction zone at a rate adequate to prevent the accumulation of liquid therein, heating the separated vapors in a confined stream to a higher cracking temperature than that to which said condensate oil is heated, directing the stream of vapors thus heated into a second reaction zone wherein cracking temperature under superatmospheric pressure is maintained and separation of vapors from liquid occurs, introducing charging stock at relatively low temperature into said stream of heated vapors passing to the second reaction zone, withdrawing liquid from said second reaction zone at a rate adequate to prevent the accumulation of liquid therein, subjecting vapors from said second reaction zone to fractionation to separate out a final light distillate and a reflux condensate and directing the reflux condensate to said heating coil.

10. The method of converting higher boiling hydrocarbon oils into lower boiling ones that comprises subjecting a condensate oil to cracking temperature in transit through a heating coil, passing the heated oil into an enlarged reaction zone wherein cracking temperature under superatmospheric pressure is maintained and separation of vapors from liquid occurs, withdrawing liquid from said reaction zone at a rate adequate to prevent the accumulation of liquid therein, heating the separated vapors in a confined stream to a higher cracking temperature than that to which said condensate oil is heated, directing the stream of vapors thus heated into a second reaction zone comprising a chamber wherein cracking temperature under superatmospheric pressure is maintained and separation of vapors from liquid occurs, introducing charging stock at relatively low temperature into said stream of heated vapors passing to the second reaction zone, introducing additional charging stock into an upper portion of said chamber to dephlegmate the vapors therein, withdrawing liquid from said chamber at a rate adequate to prevent the accumulation of liquid therein, subjecting vapors from said chamber to fractionation to separate out a final light distillate and a reflux condensate and directing the reflux condensate to said heating coil.

11. The method of converting higher boiling hydrocarbon oils into lower boiling ones that comprises subjecting a condensate oil to cracking temperature in transit through a heating coil, passing the heated oil into an enlarged reaction zone wherein cracking temperature under superatmospheric pressure is maintained and separation of vapors from liquid occurs, withdrawing liquid from said reaction zone at a rate adequate to prevent the accumulation of liquid therein, heating the separated vapors in a confined stream to a higher cracking temperature than that to which said condensate oil is heated, directing the stream of vapors thus heated into a second reaction zone wherein cracking temperature under superatmospheric pressure is maintained and separation of vapors from liquid occurs, introducing charging stock at relatively low temperature into said stream of heated vapors passing to the second reaction zone, introducing additional charging stock into an upper portion of said chamber to dephlegmate the vapors therein, scrubbing the vapors thus dephlegmated with a clean condensate oil, passing the scrubbed vapors to a fractionating tower and subjecting them therein to fractionation to separate out a final light distillate and a reflux condensate, directing the reflux condensate to said heating coil and withdrawing liquid from said chamber at a rate adequate to prevent the accumulation of liquid therein.

12. The method of converting higher boiling hydrocarbon oils into lower boiling ones that comprises subjecting a condensate oil to cracking temperature in transit through a heating coil, passing the heated oil into an enlarged reaction zone wherein cracking temperature under superatmospheric pressure is maintained and separation of vapors from liquid occurs, withdrawing liquid from said reaction zone at a rate adequate to prevent the accumulation of liquid therein, heating the separated vapors in a confined stream to a higher cracking temperature than that to which said condensate oil is heated, passing the vapors thus heated into a second reaction zone wherein cracking temperature under superatmospheric pressure is maintained and separation of vapors from liquid occurs, tempering the heat of reaction in said second reaction zone by introducing charging stock thereinto at a relatively low temperature, passing vapors from said second reaction zone to a fractionating tower maintained under superatmospheric pressure and subjecting them to fractionation therein to separate out a final light distillate and a reflux condensate, withdrawing liquid from said second reaction zone at a rate adequate to prevent the accumulation of liquid therein and expanding the withdrawn liquid into a low pressure autogenous distillation zone, condensing evolved vapors and directing the condensate into the pressure fractionating tower and directing the reflux condensate from the pressure fractionating tower to said heating coil.

RICHARD F. TROW.